US008541105B2

(12) United States Patent
Smole et al.

(10) Patent No.: US 8,541,105 B2
(45) Date of Patent: Sep. 24, 2013

(54) TRANSPARENT SUBSTRATES WITH DIELECTRIC LAYER HAVING A MARKING BELOW THE SURFACE OF THE TRANSPARENT SUBSTRATE

(75) Inventors: Philipp Smole, Buchs (CH); Michael Lanker, Pfaffikon (CH); Claus Heine-Kempkens, Maienfeld (CH)

(73) Assignee: Oerlikon Trading AG, Trubbach, Trubbach (CH)

( * ) Notice: Subject to any disclaimer, the term of this patent is extended or adjusted under 35 U.S.C. 154(b) by 1681 days.

(21) Appl. No.: 11/465,591

(22) Filed: Aug. 18, 2006

(65) Prior Publication Data

US 2007/0059455 A1    Mar. 15, 2007

Related U.S. Application Data

(60) Provisional application No. 60/709,237, filed on Aug. 18, 2005.

(51) Int. Cl.
  *B05D 3/00* (2006.01)
(52) U.S. Cl.
  USPC .................... 428/426; 428/192; 428/195.1
(58) Field of Classification Search
  USPC ............................................. 428/426
  See application file for complete search history.

(56) References Cited

U.S. PATENT DOCUMENTS

| | | | | |
|---|---|---|---|---|
| 5,637,244 | A | * | 6/1997 | Erokhin .................... 219/121.69 |
| 5,864,427 | A | * | 1/1999 | Fukano et al. ................ 359/492 |
| 6,143,382 | A | * | 11/2000 | Koyama et al. ............. 428/34.4 |
| 6,596,966 | B1 | * | 7/2003 | Kickelhain et al. ...... 219/121.69 |

FOREIGN PATENT DOCUMENTS

| | | |
|---|---|---|
| DE | 4022745 A1 | 1/1992 |
| DE | 44 07 547 B4 | 5/1996 |
| DE | 697 03 339 B4 | 4/2001 |
| DE | 199 25 801 B4 | 3/2005 |
| EP | 0 391 848 B1 | 9/1993 |
| EP | 0 743 128 B1 | 11/1996 |
| EP | 0 761 377 B1 | 6/1999 |
| WO | 92/03297 A1 | 3/1992 |
| WO | 9203297 A1 | 3/1992 |
| WO | 9525639 A1 | 9/1995 |
| WO | 9812055 A1 | 3/1998 |
| WO | 00/32531 A1 | 6/2000 |
| WO | 0032531 A1 | 6/2000 |

OTHER PUBLICATIONS http://www.merriam-webster.com/dictionary/threshold (Oct. 25, 2010).*
International Search Report, PCT/EP2006/007851, Nov. 6, 2006.

* cited by examiner

*Primary Examiner* — Gerard Higgins
*Assistant Examiner* — Sathavaram I Reddy
(74) *Attorney, Agent, or Firm* — Pearne & Gordon LLP

(57) ABSTRACT

This invention concerns a method of producing subsurface marking in a transparent body. According to the invention, the marking is done less than 500 µm below the surface by applying a layer system with a high destruction threshold, compared to the substrate, to the surface of the substrate. If the layer system is designed as an anti-reflection coating system for the reading wavelength, it increases the contrast for reading. If the layer system is designed as a mirror for the writing wavelength, the writing can be done in reflection at a lower intensity.

3 Claims, 1 Drawing Sheet

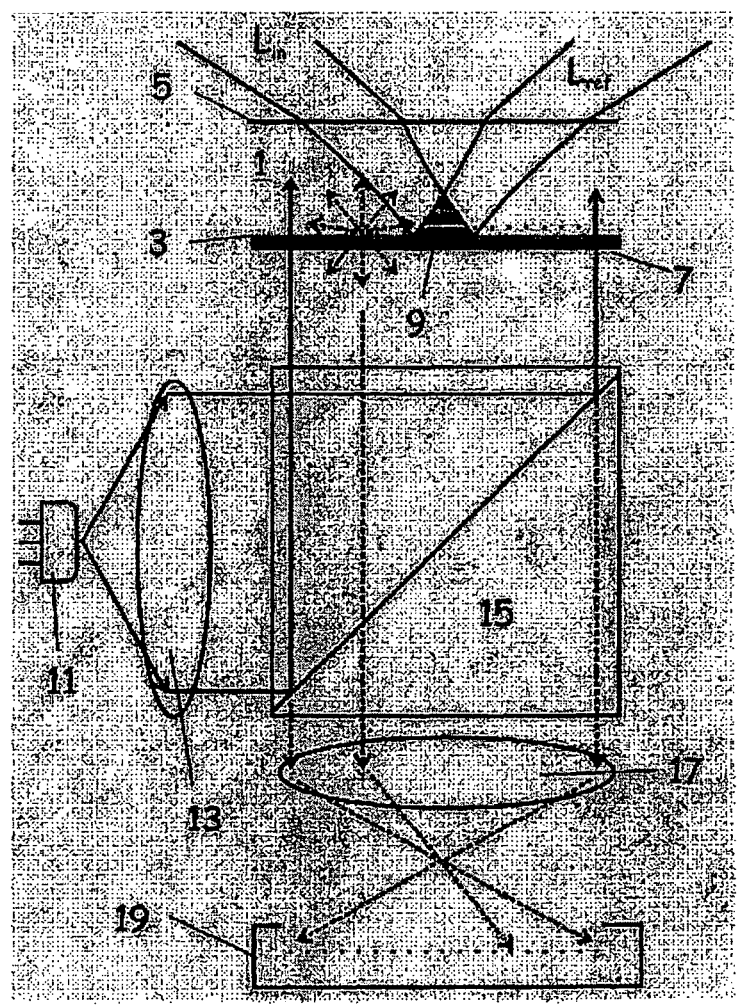

TRANSPARENT SUBSTRATES WITH DIELECTRIC LAYER HAVING A MARKING BELOW THE SURFACE OF THE TRANSPARENT SUBSTRATE

TECHNICAL FIELD

This invention concerns a method of producing a subsurface mark in a transparent body. This invention concerns especially a method of marking a transparent body that has a system of layers.

KNOWN STATE OF THE ART

For the purpose of this invention, the term glass is regarded very generally as referring to a transparent body. A body is regarded as transparent for a wavelength of light here when the penetration depth of the radiation is at least $\frac{1}{10}$ of the wavelength.

It is known how to process glass inside with laser beams. Laser Magazin 1/95, pages 16 et seq., for example, describes a method in which an Nd:YAG laser is used for the laser beam to process glass inside. Forming the beam appropriately ensures that the radiation intensity on the surface of the glass is far below the destruction threshold. Only inside the glass component does focusing cause intensities above the destruction threshold. The interaction causes local melting with crack formation that is visible macroscopically from the outside. Nd:YAG radiation at a wavelength of $\lambda=1.064$ µm is used for processing. This radiation, at very high intensities>1 GWcm2 in glass, because of non-linear optical effects, causes autofocusing and ultimately abnormal absorption, which can be seen as a melted area in the glass. The article describes how the best results for quartz glass are obtained with minimum expansion of the melted area, and approx. 100 µm is achieved. According to the article, these results are achieved only with substrates whose outer surface is a high-quality glass surface. Laser Magazin describes how the tiniest impurities and surface roughness cause a substantial reduction in the intensity threshold for destruction and thus cause unwanted interaction on the surface. For commercial grade silicate glass, the results may be less reproducible and lead to more expanded processing areas. With the glass material SF6, radiation absorption can already be observed on the surface of the glass.

Laser Magazin discusses expanding the areas being processed. But it does not address the depth of the glass in which these processed areas could be relocated. From pictures, it can be seen that it is a thick substrate (>1 mm). The text reports a material thickness of 20 mm for quartz glass. In particular, the occurrence of an expanded trace of auto-focusing and areas of interference after the actual processing area (see FIG. 3) indicate an interference area way above 1 mm. Marking glass less than 1 mm thick is therefore out of the question.

EP 0543899 discloses a method of producing a mark in a glass body in which radiation from an Nd:YAG laser at 1.064 µm was used.

The disadvantage with the known method is that, here again, there is a change in the glass beyond the actual area where the laser radiation is focused. This is associated with the fact that this bubble-like change due to local melting of the glass is shock-like, almost explosion-like. From this comes the need that the marking produced by sequencing these marking points must be a certain minimum distance away from the surface of the glass body. In the method in EP 0543899, the minimum distance from the surface of the marking in a glass body is roughly 1 mm, so that the total thickness of the glass body must be at least 3 mm to prevent the risk of fracture. In practice, however, glass plates that are only 1 mm thick must often be marked.

EP 1051365 discloses a method in which it is possible to make surface marks on glass plates that are only 1 mm thick. The marking can be done without the mark itself propagating to the surface. This is achieved by choosing a wavelength for marking that the substrate being marked is already absorbing. Preferably, the degree of transmission is between 60% and 95% of the plateau level. The degree of transmission of the area of the wavelength in which the absorption is minimal is termed the plateau level. This has the advantage that the destruction threshold in the glass material itself is reduced so far that relatively small intensities can be used and thus potential contamination of the surface or surface roughness does not matter any more. In addition, the limitation of the plateau in glass, regardless of its degree of purity, is set so it is fairly reproducible, so reproducible results can be achieved with standard glass.

However, the problem with this solution is that the wavelength has to be adjusted to the respective substrate material, since different glasses have different plateau levels. For example, the method is economically unprofitable if quartz glasses must be marked, since they have very high transmission in the UV range. With non-quartz glasses, there is another disadvantage aspect, i.e., the fact that UV light is used in EP 1051365. The final penetration depth of UV light (due to absorption) in the glass body limits the processing depth. However, if the marking is to be done just below the surface through the substrate, the method described in EP 1051365 is not suited for this.

The optics and lasers necessary for the setup are also generally expensive. The method very quickly becomes uneconomical.

TECHNICAL PROBLEM

The problem of the invention is based on disclosing a way that glass can be processed inside by means of laser beams with wavelengths in the plateau range of the transmission curve of the glass without modifying the surface. The solution in this invention should not involve any particularly pure type of glass or special requirements for the surface quality of the glass.

Another aspect of this invention is related to reading the markings. Markings that are deep below the surface of the glass are often characterized by relatively low contrast between marked places and unmarked places. Reading devices frequently do not recognize these markings or read them wrong. It would therefore be economically advantageous if simple measures were found to reduce the number of reading errors.

SOLUTION

The solution in this invention consists of covering the surface of the glass to be processed with a dielectric thin film-coating system that has at least one layer.

A person skilled in the art knows that thin-film-coating systems generally produce tension on the glass surface that they cover. Coatings applied by the vacuum coating method, for example, have tensions whose forces affect the substrate beneath. Therefore, a person skilled in the art would expect that the risk that the marking actually placed below the surface would break up through to the boundary of the substrate coating and then to the surface is, in any case, somewhat greater with a coated substrate than with no coating.

It should be noted that the total thickness of such coating is typically a maximum of a few μm. As a rule, the total thickness of such a coating is limited to less than 5 μm. Since the coating is expensive, it is an advantage to use coatings less than 3 μm.

However, as the inventors have found, coating the surface makes the process reproducible and helps keep blowouts to the surface from occurring, even if the markings are placed very close under the surface. One potential explanation for this unexpected effect could be that the lack of surface quality is neutralized by the coating. For example, if the outermost coating of the layer system has a high destruction threshold compared to the glass surface, then potential contamination or unevenness do not have the effect of pushing the destruction threshold below the destruction threshold of the glass substrate to be marked. Therefore, no destruction is visible on the outer surface of the coated substrate. But the cause of this protective effect has not been clearly explained yet. The measure in the invention leads, however, first of all, to coated substrates processed inside whose processed areas are less than 500 μm and even less than 250 μm from the surface of the boundary between the glass substrate and the first layer and do so without the processed areas reaching the surface.

Thus, for the first time, glass substrates less than 1 mm thick can be marked efficiently and economically below the surface.

The possibility of marking thin glass plates coated with a multilayer system just below the surface in the glass substrate also has the advantage that no splinters, particles, melting or blowouts occur on the surface due to the type of marking. Especially with so-called "low-defect" components, the defect-free surface plays an important role in the further processing of coated substrates.

Another important aspect of this invention is reading the marking. The fact that it is now possible to limit the marking depth to less than 100 μm below the surface highly simplifies the reading optics. Now a plane lying deep in the substrate need no longer be formed for reading, but optics can be used that allow marking only just beneath the surface. Also on the substrate side, there is the advantage that now light need no longer penetrate deep into the substrate. Therefore, substrates that have a relatively low degree of transmission (for example, k>0.01 and especially k>0.08 and even k>0.1, where k is the imaginary part of the complex refraction index) can be marked with the method in the invention.

But experiments have shown that the substrates marked just below the surface in this way provide a signal contrast that is clearly worse than with substrates whose marking is >300 μm in the substrate, for example. As the inventors discovered, however, a substantial increase in contrast can be achieved when the surface of the substrate is coated with a thin-layer system that forms an anti-reflection coating. It is suspected that with uncoated surfaces, some of the light used for reading is reflected directly to the boundary that forms the surface and overlaps the actual signal and thus interferes with it. In a case where the conventional reading lens goes deep into the substrate, the conventional reading lens may ignore the signal reflected from the surface. But here since the marking is close to the surface, the signal can no longer be separated so easily from the surface reflection. The surface reflection is reduced by means of the antireflection coating. This substantially increases the contrast in the reading signal. The invention therefore contains a substrate marked below the surface that has means of reducing the reading light reflected directly on the surface.

The method of marking transparent substrates below the surface is therefore inventive, and the method includes the following steps:
  providing a substrate
  marking the substrate by means of a visible light focused under the surface
whereby before the substrate is marked by means of visible light, it is coated with a coating system that includes at least one dielectric layer, whereby the destruction threshold of the layer material, when radiated with the light used for marking, is above the destruction threshold of the substrate material.

It is possible to make the marking less than 500 μm, and preferably less than 350 μm, from the surface of the layer system bordering the substrate without damaging the surface.

It is an advantage in reading if the layer system is effectively designed as an antireflection layer for a wavelength suited for reading the marking.

In such a method, the lateral projected pixel density can also be increased if the markings are written at two different depths, and the difference in the depths is on the magnitude of the lateral pixel density.

If the layer system is designed as a mirror as light used for marking and if the marking is done by means of reflection on the layer system acted on by the substrate, then the intensity in the overlapping areas is higher.

At the same time, the layer system can in turn be designed so that it is at least partly transmissive for reading appropriate wavelengths.

A substrate is produced with marking below the surface and a dielectric layer system that includes at least one dielectric layer, whereby the marking in the substrate is only 500 μm below the surface of the border between the dielectric layer system and the substrate, but does not continue to the border area.

It is an advantage when the material in the layer system for at least one wavelength suited for marking in the visible range has a high destruction threshold compared to the substrate material.

For reading, it is an advantage if the layer system is designed as an anti-reflection coating for at least one wavelength suited for reading the marking.

A substrate with the above-mentioned marking and the layer system designed as a mirror layer for a wavelength suited for marking is part of the invention.

The invention will now be described more specifically below using examples and explained in detail.

In the first example, borofloat glass is coated with a four-layer antireflection coating. Borofloat glass has a refraction index of 1.52. The following layer system was applied by the PVD method (physical vapor deposition):

|         | Refraction index | Thickness (nm) |
| --- | --- | --- |
| Air     | 1     | —          |
| Layer 4 | 1.38  | 114.673913 |
| Layer 3 | 1.905 | 83.0708661 |
| Layer 2 | 1.76  | 89.9147727 |
| Layer 1 | 1.38  | 229.347826 |
| Glass   | 1.52  | —          |

Then the inside of the substrate is processed with a frequency-doubled Nd:YAG laser, i.e., the laser wavelength used for the marking was 532 nm in air.

The use of visible light, i.e., light in the wavelength range from 420 nm to 780 nm, has substantial advantages compared to the wavelengths selected in the state of the art:

If 1064 nm is used, i.e., the light of a non-frequency-doubled ND;YAG laser, a substantial contribution to the damage mechanism (pixel) is the thermal melting of the surface of the glass or the inside which leads to the "penetration channel." The result of the thermal effects is that the pixels become clearly larger, since more energy must be used compared to 532, in order to produce intensities above the threshold, and they cannot be transported fast enough from the dielectric body. (Absorption limits the penetration depth of the focused beam.)

In the UV range, the basic damage effect is laser ablation, i.e., collision ionization. Due to the relatively high absorption coefficients (up to 20%) of some industrial glass in this range, this process is only conditionally appropriate, to use deep marking, on one hand, and different types of glass, on the other. (Absorption limits the penetration depth of the focused beam.)

At 532 nm, a combination of thermal melting and laser ablation helps contribute to a pixel-producing effect. Therefore, pixels as small as desired are produced, depending whether the lens is focused in a much higher range of depth (near the surface of the glass (limited to 1064 nm) and deep within the glass (limited to the UV range by absorption). The pixel size basically depends on the energy and focus of the beam, but not on the material properties (transmissive optical properties required).

It is also much simpler to adjust the laser beam since it is visible. The adjustment can be made at a lower intensity to protect the eyes of the person doing the adjusting.

With this system, letters were written with pixel script. The individual pixels were 100 μm apart. The vertical expansion of the pixels measured was 80-100 μm. The horizontal expansion of the pixels measured was around 20-50 μm.

The distance to the surface was 300 μm. No blowouts to the surface were detected.

In this method, it turned out that due to the AR (antireflection layer), the same results (pixel size) can be achieved with lower intensities. The effect is probably based on the fact that the reflection of the laser light was reduced on the coating/air and glass/coating border.

A second experiment was done to increase the horizontal pixel density, without causing cracks that connect the individual pixels. Experiments have shown that simply reducing the distance between two pixels results in precisely such connecting cracks. Thus, the risk becomes very great that such a crack connecting the pixels will grow and ultimately reach the surface.

The problem of increasing the pixel density without damage was solved by the inventors in that, although only a plane structure (numeric and alphanumeric characters) was needed, they wrote a second plane of pixels, whereby the horizontal center of the pixels in the second plane was in the space between the pixels in the first plane. Both planes are only 150 μm apart. This gives the onlooker the impression of increased pixel density, and clearly increases the contrast ratio.

In a third example, the substrate was written from the back just below the surface. The substrate in the example had a refractive index of n=1.52. For the polarization of the laser, the p-polarization was selected and the angle of incidence chosen was 57°, which corresponds roughly to the Brewster angle. This guarantees that only very little is reflected from the back of the glass substrate when the laser beam hits it. In glass, the light then propagates according to Snellius' Law at an angle of 38°.

The front of the substrate has a multilayer system, which at 38° reflects light, basically green light, but at least light in the wavelength that corresponds to the wavelength used for marking. Preferably, all light used for writing is reflected. In the example, the frequency-doubled radiation of an Nd:YAG laser with a wavelength of 532 nm is used.

In the writing process, because of the reflection just below the surface of the coated side of the glass substrate, an overlapping area is created in which incident light and reflected light overlap and form an interference pattern. If the laser energy is set so that the intensity in the single beam is clearly below the destruction threshold, there are, however, places in the overlapping area in which the intensity is above the destruction threshold, so marking is limited to the overlapping area. This effect is supported by having so-called interference strips with four times the intensity produced in the overlapping area.

The above-mentioned multilayer system is preferably selected, if possible, so that it acts as an anti-reflection coating for the light used for reading. In the example, the reading is done at 0° by a blue LED.

FIG. 1 shows the situation schematically. It shows the substrate 1 with the front 3 and the back 5. The front 3 is coated with the dielectric layer system 7. The writing beam Lin that comes through the back 5 is reflected on the layer system 7 of the front 3 in the substrate 1 and comes out of the substrate 1 through the back 5 as a reflected writing beam Lef. In the overlapping area 9 in which the incident writing beam Lin and the reflected writing beam Lref overlap, because of the coherence of the laser radiation used as the writing beam, an interference pattern is formed with the characteristic interference stripes, in which the convexities are higher in intensity. The pixels of the marking are shown by a dotted line in the substrate 1.

For reading, the light of a blue LED 11 is collimated by means of a first lens 13 and is pointed at the marked substrate 1 to be read by a beam splitter 15. The layer system 7 is acted on by the blue light as an AR coating at 0°. The light thus hits the marking and is partly scattered back to the beam splitter 15. As an example, the scattered light is shown schematically on one pixel by arrows with dashes. The back-scattered light transmits the beam splitter 15 partially. The marking plane is thus shown in the detector 19 by means of a second lens 17.

The invention claimed is:

1. A device comprising:
   a transparent substrate;
   a dielectric layer system that includes at least one dielectric layer defining a border area at a surface of the substrate; and
   a laser-induced marking below the surface of the substrate at the border area,
   wherein at least part of the laser-induced marking is within 500 μm of the surface and does not reach the border area, and
   wherein a material for the dielectric layer system has a higher destruction threshold compared to a material of the transparent substrate for at least one wavelength in the visible region, which has been used to mark the transparent substrate to form the laser induced marking.

2. The device in claim 1, wherein the dielectric layer system is designed as an anti-reflection coating for at least one wavelength suitable for reading the laser-induced marking.

3. The device in claim 1, wherein the dielectric layer system is designed as a mirror layer for the at least one wavelength in the visible range.

* * * * *